US006778321B1

(12) United States Patent
Islam

(10) Patent No.: US 6,778,321 B1
(45) Date of Patent: Aug. 17, 2004

(54) FIBER OPTIC TRANSMISSION SYSTEM FOR A METROPOLITAN AREA NETWORK

(75) Inventor: Mohammed N. Islam, Allen, TX (US)

(73) Assignee: Xtera Communications, Inc., Allen, TX (US)

(*) Notice: Subject to any disclaimer, the term of this patent is extended or adjusted under 35 U.S.C. 154(b) by 112 days.

(21) Appl. No.: 10/116,487

(22) Filed: Apr. 3, 2002

Related U.S. Application Data
(60) Provisional application No. 60/365,127, filed on Mar. 15, 2002.

(51) Int. Cl.[7] .............................. H01S 3/00; H04S 10/00
(52) U.S. Cl. ...................................... 359/334; 398/157
(58) Field of Search .......................... 398/157; 359/334

(56) References Cited

U.S. PATENT DOCUMENTS

| 3,772,528 | A | 11/1973 | Anderson | 307/88.3 |
|---|---|---|---|---|
| 4,616,898 | A | 10/1986 | Hicks, Jr. | 350/96.15 |
| 4,700,339 | A | 10/1987 | Gordon et al. | 370/3 |
| 4,932,739 | A | 6/1990 | Islam | 350/96.15 |
| 4,995,690 | A | 2/1991 | Islam | 350/96.15 |
| 5,020,050 | A | 5/1991 | Islam | 370/4 |
| 5,060,302 | A | 10/1991 | Grimes | 359/135 |
| 5,078,464 | A | 1/1992 | Islam | 385/122 |
| 5,101,456 | A | 3/1992 | Islam | 385/27 |
| 5,115,488 | A | 5/1992 | Islam et al. | 385/129 |
| 5,117,196 | A | 5/1992 | Epworth et al. | 359/333 |
| 5,224,194 | A | 6/1993 | Islam | 385/122 |
| 5,225,922 | A | 7/1993 | Chraplyvy et al. | 359/124 |
| 5,343,322 | A | 8/1994 | Pirio et al. | 359/173 |
| 5,369,519 | A | 11/1994 | Islam | 359/173 |
| 5,485,536 | A | 1/1996 | Islam | 385/31 |
| 5,557,442 | A | 9/1996 | Huber | 359/179 |
| 5,559,920 | A | 9/1996 | Chraplyvy et al. | 385/123 |

(List continued on next page.)

FOREIGN PATENT DOCUMENTS

| EP | 0 829 980 A2 | 3/1998 | H04J/14/02 |
|---|---|---|---|
| EP | 0 903 877 A2 | 3/1999 | H04B/10/18 |
| EP | 0 911 926 A1 | 4/1999 | H01S/3/10 |
| EP | 0 936 761 A1 | 8/1999 | H04B/10/18 |
| EP | 0 959 578 A2 | 11/1999 | H04J/14/02 |
| EP | 1 054 489 A2 | 11/2000 | H01S/3/067 |
| EP | 1 069 712 A2 | 1/2001 | H04B/10/17 |
| WO | 98/36479 | 8/1998 | H01S/3/10 |
| WO | 98/42088 | 9/1998 | H04B/10/17 |
| WO | 99/43117 | 8/1999 | H04J/14/00 |
| WO | 99/66607 | 12/1999 | |
| WO | 00/73826 A2 | 7/2000 | G02B/6/00 |
| WO | 00/49721 | 8/2000 | |
| WO | 00/72479 | 11/2000 | H04B/10/08 |

OTHER PUBLICATIONS

Tonguz et al., "Gain Equalization of EDFA Cascades," Journal of Lightwave Technology, vol. 15, No. 10, pp. 1832–1841, Oct. 1997.

(List continued on next page.)

Primary Examiner—Mark Hellner
(74) Attorney, Agent, or Firm—Baker Botts L.L.P.

(57) ABSTRACT

A fiber optic transmission system for a metropolitan area network includes a plurality of interface devices operable to be coupled to a fiber optic transmission link carrying an optical signal and having a length of 300 km or less. The link has a transmission loss associated with an unpumped state of the link, and the plurality of interface devices collectively introduce a loss of at least 6 decibels to the link. The system also includes a distributed Raman amplifier stage coupled to the link, the distributed Raman amplifier stage operable to pump at least a portion of the link to reduce the transmission loss of the at least a portion of the link compared to its unpumped state, the reduced link transmission loss facilitating allocation of at least a portion of a gain to at least partially offset the loss associated with the plurality of interface devices.

93 Claims, 2 Drawing Sheets

U.S. PATENT DOCUMENTS

| | | | |
|---|---|---|---|
| 5,623,508 A | 4/1997 | Grubb et al. ................... | 372/3 |
| 5,664,036 A | 9/1997 | Islam ........................... | 385/31 |
| 5,673,280 A | 9/1997 | Grubb et al. ................... | 372/3 |
| 5,778,014 A | 7/1998 | Islam ........................... | 372/6 |
| 5,790,289 A | 8/1998 | Taga et al. .................... | 359/124 |
| 5,796,909 A | 8/1998 | Islam .......................... | 385/147 |
| 5,801,860 A | 9/1998 | Yoneyama .................... | 359/124 |
| 5,815,518 A | 9/1998 | Reed et al. ..................... | 372/6 |
| 5,852,510 A | 12/1998 | Meli et al. ................... | 359/341 |
| 5,887,093 A | 3/1999 | Hansen et al. ................ | 385/27 |
| 5,905,838 A | 5/1999 | Judy et al. ................... | 385/123 |
| 5,920,423 A | 7/1999 | Grubb et al. ............... | 359/341 |
| 5,959,750 A * | 9/1999 | Eskildsen et al. ........... | 359/134 |
| 5,959,766 A | 9/1999 | Otterbach et al. .......... | 359/337 |
| 5,978,130 A | 11/1999 | Fee et al. ................... | 359/341 |
| 5,995,275 A | 11/1999 | Sugaya ....................... | 359/341 |
| 6,040,933 A | 3/2000 | Khaleghi et al. ............ | 359/124 |
| 6,043,927 A | 3/2000 | Islam .......................... | 359/332 |
| 6,049,413 A | 4/2000 | Taylor et al. ................ | 359/337 |
| 6,052,393 A | 4/2000 | Islam ............................ | 372/6 |
| 6,055,092 A | 4/2000 | Sugaya et al. ............... | 359/337 |
| 6,067,177 A | 5/2000 | Kanazawa ................... | 359/124 |
| 6,072,601 A | 6/2000 | Toyohara .................... | 358/484 |
| 6,081,366 A | 6/2000 | Kidorf et al. ............... | 359/341 |
| 6,088,152 A | 7/2000 | Berger et al. ................ | 359/334 |
| 6,094,296 A | 7/2000 | Kosaka ....................... | 359/341 |
| 6,101,024 A | 8/2000 | Islam et al. .................. | 359/334 |
| 6,104,848 A | 8/2000 | Toyohara et al. ............. | 385/24 |
| 6,115,157 A | 9/2000 | Barnard et al. ............. | 359/124 |
| 6,115,174 A | 9/2000 | Grubb et al. ............... | 359/334 |
| 6,134,034 A | 10/2000 | Terahara ..................... | 359/124 |
| 6,147,794 A | 11/2000 | Stentz ......................... | 359/334 |
| 6,151,160 A | 11/2000 | Ma et al. ..................... | 359/341 |
| 6,163,636 A | 12/2000 | Stentz et al. ................. | 385/24 |
| 6,172,803 B1 | 1/2001 | Masuda et al. ............. | 359/341 |
| 6,181,464 B1 | 1/2001 | Kidorf et al. ............... | 359/334 |
| 6,185,022 B1 | 2/2001 | Harasawa ................... | 359/124 |
| 6,219,162 B1 | 4/2001 | Barnard et al. ............. | 359/124 |
| 6,219,176 B1 | 4/2001 | Terahara ..................... | 359/341 |
| 6,229,937 B1 | 5/2001 | Nolan et al. .................. | 385/24 |
| 6,239,902 B1 | 5/2001 | Islam et al. ................. | 359/334 |
| 6,239,903 B1 | 5/2001 | Islam et al. ................. | 359/337 |
| 6,263,139 B1 | 7/2001 | Kawakami et al. ......... | 385/123 |
| 6,271,945 B1 | 8/2001 | Terahara ..................... | 359/124 |
| 6,282,002 B1 | 8/2001 | Grubb et al. ............... | 359/160 |
| 6,310,716 B1 | 10/2001 | Evans et al. ................. | 359/334 |
| 6,320,884 B1 | 11/2001 | Kerfoot, III et al. ............ | 372/3 |
| 6,335,820 B1 | 1/2002 | Islam .......................... | 359/334 |
| 6,341,034 B1 | 1/2002 | Sun et al. ............... | 359/341.41 |
| 6,344,922 B1 | 2/2002 | Grubb et al. ............... | 359/334 |
| 6,356,383 B1 | 3/2002 | Cornwell, Jr. et al. ...... | 359/334 |
| 6,356,384 B1 | 3/2002 | Islam .......................... | 359/334 |
| 6,359,725 B1 | 3/2002 | Islam .......................... | 359/334 |
| 6,370,164 B1 | 4/2002 | Islam ............................ | 372/6 |
| 6,374,006 B1 | 4/2002 | Islam et al. ................... | 385/15 |
| 6,381,391 B1 | 4/2002 | Islam et al. ................. | 385/123 |
| 6,388,801 B1 | 5/2002 | Sugaya et al. ............... | 359/334 |
| 6,404,523 B1 | 6/2002 | Morikawa et al. .......... | 359/124 |
| 6,404,964 B1 | 6/2002 | Bhagavatula et al. ....... | 385/123 |
| 6,414,786 B1 | 7/2002 | Foursa ........................ | 359/334 |
| 6,417,959 B1 | 7/2002 | Bolshtyansky et al. ..... | 359/334 |
| 6,437,906 B1 | 8/2002 | Di Pasquale et al. .... | 359/337.2 |
| 6,529,315 B2 * | 3/2003 | Bartolini et al. ............ | 359/334 |
| 6,633,712 B2 * | 10/2003 | Dennis et al. ............... | 385/123 |
| 2001/0014194 A1 | 8/2001 | Sasaoka et al. .............. | 385/15 |
| 2001/0050802 A1 | 12/2001 | Namiki et al. ......... | 359/337.11 |
| 2002/0001123 A1 | 1/2002 | Miyakawa et al. ......... | 359/334 |
| 2002/0048062 A1 | 4/2002 | Sakamoto et al. .......... | 359/124 |
| 2002/0060821 A1 | 5/2002 | Manna et al. ............... | 359/124 |

OTHER PUBLICATIONS

Rotwitt et al., "Distributed Raman Amplifiers for Long Haul Transmission Systems," IEEE, pp. 251–252, 1998.

Kawai et al., "Ultrawide, 75nm 3–dB gain–band optical amplifier utilizing erbium–doped fluoride fiber and Raman fiber," Tuesday Afternoon, OFC Technical Digest, TuG3, pp. 32–33, 1998.

Hansen et al.; "Loss compensation in dispersion compensating fiber modules by Raman amplification," Optical Fiber Conference OFC'98, Technical Digest TuD1, pp. 20–21, Feb. 1998.

Masuda et al., "Ultrawide 75–nm 3–dB Gain–Band Optical Amplification with Erbium–Doped Fluoride Fiber Amplifiers and Distributed Raman Amplifiers," IEEE Photonics Technology Letters, vol. 10, No. 4, pp. 516–518, Apr. 1998.

Dianov, et al., Highly efficient 1.3 μm Raman fibre amplifier, Electronics Letters, vol. 34, No. 7, Apr. 2, 1998.

Emori et al., OSA Topical Meeting on Optical Amplifiers and Their Applications OAA'98, postdeadline paper PD3, Vail, CO, Jul. 1998.

Forghieri et al., "Simple Model of Optical Amplifier Chains to Evaluate Penalties in WDM Systems," Journal of Lightwave Technology, vol. 16, No. 9, pp. 1570–1576, Sep. 1998.

Chernikov et al., "Broadband Silica Fibre Raman Amplifiers at 1.3 μm and 1.5μm," ECOC, pp. 49–50, Sep. 20–24, 1998.

Letellier et al., "Access to Transmission Performance Margins Through Pre–emphasis Adjustment in WDM Systems," ECOC, pp. 275–276, Sep. 20–24, 1998.

Becker et al., "Erbium Doped Fiber Amplifiers Fundamentals and Technology," Academic Press, pp. 55–60 plus title and copyright page, 1999.

Chernikov et al., "Broadband Raman amplifiers in the spectral range of 1480–1620 nm," OFC/IOOC Technical Digest, vol. 2, pp. 117–119, Feb. 21–26, 1999.

Masuda et al., "Wide–Band and Gain–Flattened Hybrid Fiber Amplifier Consisting of an EDFA and a Multiwavelength Pumped Raman Amplifier," IEEE Photonics Technology Letters, vol. 11, No. 6, pp. 647–649, Jul. 1999.

Kawai et al. "Wide–Bandwidth and Long–Distance WDM Transmission Using Highly Gain–Flattened Hybrid Amplifier," IEEE Photonics Technology Letters, vol. 11, No. 7, pp. 886–888, Jul. 1999.

Lewis et al., "Gain and saturation characteristics of dual–wavelengh–pumped silica–fibre Raman amplifiers," Electronics Letters, vol. 35, No. 14, pp. 1178–1179, Jul. 8, 1999.

Suzuki et al., "50 GHz spaced, 32 x 10 Gbit/s dense WDM transmission in zero–dispersion region over 640km of dispersion–shifted fibre with multiwavelength distributed Raman amplification," Electronics Letters, vol. 35, No. 14, pp. 1175–1176, Jul. 8, 1999.

Emori et al., "100nm bandwidth flat–gain Raman amplifiers pumped and gain–equalised by 12–wavelength–channel WDM laser diode unit," Electronics Letters, vol. 35, No. 16, pp. 1355–1356, Aug. 5, 1999.

Yun et al., "Dynamic Erbium–Doped Fiber Amplifier Based on Active Gain Flattening with Fiber Acoustooptic Tunable Filters," IEEE Photonics Technology Letters, vol. 11, No. 10, pp. 1229–1231, Oct. 1999.

Mikkelsen et al., "160 Gb/s TDM Transmission Systems," ECOC, 4 pages, 2000.

Manna et al., "Modeling of Penalties on Chains of Optical Amplifiers with Equalizing Filters," Journal of Lightwave Technology, vol. 18, No. 3, pp. 295–300, Mar. 2000.

Nielsen et al., "3.28 Tb/s (82/spl times 40 Gb/s) transmission over 3/spl times 100 km nonzero–dispersion fiber using dual C– and L–band hybrid Raman/erbium–doped inline amplifiers," OFCC 2000, pp. 236–238 plus internet title page, Mar. 7–Oct. 2000.

Sano et al., "20 Gbit/s chirped return–to–zero transmitter with simplified configuration using electro–absorption modulator," Electronics Letters, vol. 36, No. 22, 2 pages, Oct. 26, 2000.

Fludger et al., "Fundamental Noise Limits in Broadband Raman Amplifiers," OFC, pp. MA5/1–MA5/3, 2001.

Seo et al., "Compensation of Raman–Induced Crosstalk Using a Lumped Germanosilicate Fiber Raman Amplifier in the 1.571–1.591–$\mu$m Region," IEEE Photonics Technology Letters, vol. 13, No. 1, pp. 28–30, Jan. 2001.

Seo et al., "Simultaneous Amplification and Channel Equalization Using Raman Amplifier for 30 Channels in 1.3–$\mu$m Band," Journal of Lightwave Technology, vol. 19, No. 3, pp. 391–397, Mar. 2001.

Chen et al., "Transient effects in saturated Raman amplifiers," Electronics Letters, vol. 37, No. 6, 2 pgs., Mar. 15, 2001.

Optical Society of America, Optical Amplifiers and Their Applications, Technical Digest, entitled "Raman amplification and dispersion–managed solitons for all–optical, ultra–long–haul, dense WDM.", Jul. 1–4, 2001.

Menif et al., "Application of Preemphasis to Achieve Flat Output OSNR in Time–Varying Channels in Cascaded EDFAs Without Equalization," Journal of Lightwave Technology, vol. 19, No. 10, pp. 1440–1452, Oct. 2001.

Murakam et al., "WDM Upgrading of an Installed Submarine Optical Amplifier System," Journal of Lightwave Technology, vol. 19, No. 11, pp. 1665–1674, Nov. 2001.

Scheerer et al., "SRS crosstalk in preemphasized WDM Systems," pp. WM28–1/293–WM28–3/295.

Yariv, "Optical Electronics in Modern Communications," Detection of Optical Radiation, Ch. 11, pp. 412–473.

Nissov et al., "100 Gb/s (10x10Gb/s) WDM Transmission Over 7200 km Using Distributed Raman Amplification," pp. 9–12.

Rottwitt et al., "A 92 nm Bandwidth Raman Amplifier," paper PD–6, pp. 1–4.

"Forward Error Correction in Optical Transmission, Reed Solomon and Turbo Product Codes compared," 2 pages.

Tashiro et al., "1.5 W Erbium Doped Fiber Amplifier Pumped by the Wavelength Division–Multiplexed 1480 nm Laser Diodes with Fiber Bragg Grating," Optical Transmission Systems Group, paper WC2–1–3, pp. 213–213.

Srivastava et al., "High–speed WDM Transmission in All–Wave™ Fiber in Both the 1.4–$\mu$m and 1.55–$\mu$m Bands," paper PD–2–5, Vail, CO.

Emori et al., "Less than 4.7 dB Noise Figure Broadband in–line EDFA with A Raman Amplified–1300 ps/nm DCF Pumped by Multi–channel WDM Laser Diodes," paper PD3–2–5.

Koch et al., "Broadband gain flattened Raman Amplifier to extend operation in the third telecommunication window," FF3–1–3, pp. 103–105.

Emori et al., "Cost–effective depolarized diode pump unit designed for C–band flat–gain Raman amplifiers to control EDFA gain profile," FF4–1–3, pp. 106–108.

Pending Patent Application; WO 99/66607; entitled "Dispersion Compensating and Amplifying Optical Element, Method for Minimizing Gain Tilt, and Apparatus for Minimizing Non–Linear Interaction between Band Pumps," by Mohammed N. Islam et al, filed Jun. 16, 1999.

Pending patent application; USSN 09/766,489; entitled "Nonlinear Polarization Amplifiers in Nonzero Dispersion Shifted Fiber," by Mohammed N. Islam, filed Jan. 19, 2001.

Pending patent application; USSN 09/765,972; entitled "S+ Band Nonlinear Polarization Amplifiers," by Mohammed N. Islam, filed Jan. 19, 2001.

Pending patent application, USSN 09/768,367, entitled "All Band Amplifier," by Mohammed N. Islam, filed Jan. 22, 2001.

Pending patent application; USSN 09/800,085; entitled "Dispersion Compensating Nonlinear Polarization Amplifier," by Mohammed N. Islam, filed Mar. 05, 2001.

Pending patent application; USSN 09/811,067, entitled "Method and System for Reducing Degredation of Optical Signal to Noise Ratio," by Michel W. Chbat et al., filed Mar. 16, 2001.

Pending patent application; USSN 09/811,103; entitled "System and Method for Wide Band Raman Amplification," by Mohammed N. Islam et al, filed Mar. 16, 2001.

Pending patent application; USSN 09/916,454; entitled "System and Method for Controlling Noise Figure," by Mohammed N. Islam et al, filed Jul. 27, 2001.

Pending patent application; USSN 10/003,199; entitled "Broadband Amplifier and Communications System," by Mohammed N. Islam, filed Oct. 30, 2001.

Pending patent application; USSN 10/007,643; entitled "Multi–Stage Optical Amplifier and Broadband Communication System," by Mohammed Islam, filed Nov. 6, 2001.

Pending patent application; USSN 10/005,472; entitled "Multi–Stage Optical Amplifier and Broadband Communication System," by Mohammed Islam, filed Nov. 06, 2001.

Pending patent application; USSN 09/990,142; entitled "Broadband Amplifier and Communication System," by Mohammed N. Islam, filed Nov. 20, 2001.

Pending patent application; USSN 10/014,839; entitled "Multi–Stage Optical Amplifier and Broadband Communication System," by Mohammed N. Islam, filed Dec. 10, 2001.

Pending patent application; USSN 10/100,589; entitled "System and Method for Dispersion Compensation in an Optical Communication System," by Mohammed N. Islam et al., filed Mar. 15, 2002.

Pending patent application; USSN 10/100,591; entitled "System and Method for Managing System Margin," by Mohammed N. Islam et al., filed Mar. 15, 2002.

Pending patent application; USSN 10/100,587; entitled "Fiber Optic Transmission System with Low Cost Transmitter Compensation," by Mohammed N. Islam, filed Mar. 15, 2002.

Pending patent application; USSN 10/100,700; entitled "Rack System for an End Terminal in an Optical Communication Network," by Mohammed N. Islam et al., filed Mar. 15, 2002.

Pending patent application; USSN 10/211,209; entitled "Active Gain Equalization," by Mohammed N. Islam et al., filed Aug. 02, 2002.

White et al.; "Optical Fiber Components and Devices," Optical Fiber Telecommunications, Ch. 7, pp. 267–319, 1997.

Agrawal, "Fiber–Optic Communication Systems," Second Edition, Basic Concepts, John Wiley & Sons, pp. 365–366 plus title page and copyright page, 1997.

Masuda et al., "Ultra–wideband optical amplification with 3dB bandwidth of 65 nm using a gain–equalized two–stage erbium–doped fibre amplifier and Raman amplification," Electronics Letters, vol. 33, No. 9, pp. 73–78, Feb. 24, 1997.

Chraplyvy et al., "Equalization in Amplified WDM Lightwave Transmission Systems," IEEE Photonics Technology Letters, vol. 4, No. 8, pp. 920–922, Aug. 1992.

Sekine et al., "10Gbit/s four–channel WDM transmission experiment over 500km with technique for suppressing four–wave mixing," Electronics Letters, vol. 30, No. 14, pp. 1150–1151, Jul. 07, 1994.

Hansen et al., "Repeaterless transmission experiment employing dispersion," 21st European Conferene on Optical Communication, vol. 2, 1 page, Sep. 17–21, 1995.

Liaw et al., "Passive Gain–Equalized Wide–band Erbium––Doped Fiber Amplifier Using Samarium–Doped Fiber," IEEE Photonics Technology Letters, vol. 8, No. 7, pp. 879–881, Jul. 1996.

Hiroji Masuda and Shingo Kawal, Ultra Wide–Band Raman Amplification With A Total Gain–Bandwidth of 132 nm Of Two Gain–Bands Around 1.5 $\mu$m, ECOC '99, Nice, France, pp. II–146–II–147, Sep. 26–30, 1999.

Sugizaki, et al., Slope Compensating DCF for S–band Raman Amplifier, OSA TOPS vol. 60, Optical Amplifiers and Their Applications, Nigel Jolley, John D. Minelly, and Yoshiaki Nakano, eds., 2001 Optical Society of America, pp. 49–53, 2001.

Vasilyev, et al., Pump intensity noise and ASE spectrum of Raman amplification in non–zero dispersion–shifted fibers, reprinted from the Optical Amplifiers and Their Applications Conference, 2001 Technical Digest, 2001 Optical Society of America, pp. 57–59, 2001.

\* cited by examiner

FIBER OPTIC TRANSMISSION SYSTEM FOR A METROPOLITAN AREA NETWORK

RELATED APPLICATIONS

This application claims priority to Ser. No. 60/365,127, entitled "Fiber Optic Transmission System for a Metropolitan Area Network," filed provisionally on Mar. 15, 2002.

TECHNICAL FIELD OF THE INVENTION

The present invention relates in general to fiber optic technology and more particularly to a fiber optic transmission system in a metropolitan area network.

OVERVIEW

In conventional fiber optic transmission systems, Raman amplification is associated with long haul, for example, greater than 500 km, and ultra long haul, for example, greater than 3000 km, transport. In metropolitan area networks spanning distances of, for example, less than 300 km, there is a necessity to support a broad spectrum of services and data rates in the metropolitan environment while keeping the costs as low as possible. Apparently because of a perceived large expense involved with the use of Raman amplification, conventional metropolitan optical transmission systems have avoided the use of Raman amplifiers. Instead, Raman amplifiers have been viewed as useful only to extend transmission distances far beyond those used in typical metropolitan systems.

SUMMARY OF EXAMPLE EMBODIMENTS

From the foregoing, it may be appreciated by those skilled in the art that a need has arisen for a technique to compensate for losses introduced into a metropolitan fiber optic transmission environment. In accordance with the present invention, a fiber optic transmission system in a metropolitan area network is provided that substantially eliminates or greatly reduces disadvantages and problems associated with conventional metropolitan fiber optic implementations.

In one embodiment, a fiber optic transmission system for a metropolitan area network comprises a plurality of interface devices operable to be coupled to a fiber optic transmission link carrying an optical signal and having a length of 300 km or less. The link has a transmission loss associated with an unpumped state of the link, and the plurality of interface devices collectively introduce a loss of at least 6 decibels to the link. The system also comprises a distributed Raman amplifier stage coupled to the link, the distributed Raman amplifier stage operable to pump at least a portion of the link to reduce the transmission loss of the at least a portion of the link compared to its unpumped state, the reduced link transmission loss facilitating allocation of at least a portion of a gain to at least partially offset the loss associated with the plurality of interface devices.

In another embodiment, a fiber optic transmission system for a metropolitan area network comprises a transmitter assembly operable to generate a plurality of optical wavelength signals. The system also comprises a combiner operable to combine the plurality of optical wavelength signals into a multiple wavelength optical signal comprising at least 160 wavelengths and occupying a bandwidth of at least 60 nanometers. The combiner is operable to facilitate communication of the multiple wavelength optical signal over a communication link in a metropolitan area network spanning no more than 300 kilometers. The system further comprises a multiple stage optical amplifier coupled to the communication link and comprising at least one Raman amplifier stage capable of operating on a bandwidth of at least 60 nanometers.

In still another embodiment, a fiber optic transmission system for a metropolitan area network comprises a transmitter assembly operable to generate a plurality of optical wavelength signals. Each of the plurality of optical wavelength signals comprises a transport rate of at least 9.5 gigabits per second. The system also comprises a combiner operable to combine the plurality of optical wavelength signals into a multiple wavelength optical signal and to facilitate communication of the multiple wavelength optical signal over a communication link in a metropolitan area network spanning no more than 300 kilometers. The system further comprises a discrete Raman amplifier stage comprising a gain medium. At least a portion of the gain medium comprises a dispersion compensating fiber operable to at least partially compensate for a dispersion in at least some of the plurality of optical wavelength signals. The discrete Raman amplifier stage is operable to pump the dispersion compensating fiber to produce Raman gain to at least partially offset a loss associated with the dispersion compensating fiber.

In another embodiment, an optical communication system comprises a communication link in a metropolitan area network spanning no more than 300 kilometers. The communication link is operable to communicate a multiple wavelength optical signal comprising at least 160 wavelengths and occupying a bandwidth of at least 60 nanometers. At least some wavelengths are dedicated for communication with particular nodes coupled to the communication link. The system also comprises a multiple stage optical amplifier coupled to the communication link and comprising at least one Raman amplifier stage capable of operating on a bandwidth of at least 60 nanometers.

A method embodiment comprises communicating a plurality of optical signals over a communication link in a metropolitan area network spanning 300 kilometers or less, wherein the communication link comprises a transmission loss associated with an unpumped state. The method further comprises passing at least some of the plurality of optical signals through a plurality of interface devices coupled to the communication link, wherein the plurality of interface devices collectively introduce a loss of at least 6 decibels to the communication link. The method still further comprises forming a distributed Raman amplification stage by pumping at least a portion of the communication link to reduce the transmission loss of the at least a portion of the link compared to its unpumped state, the reduced link transmission loss facilitating allocation of at least a portion of a gain to at least partially offset the loss associated with the plurality of interface devices.

In another method embodiment, a method of communicating optical signals in a metropolitan area network comprises generating a plurality of optical wavelength signals and combining at least some of the plurality of wavelength signals into a multiple wavelength optical signal comprising at least 160 wavelengths and occupying a bandwidth of at least 60 nanometers. The method also comprises communicating the multiple wavelength optical signal over a communication link in a metropolitan area network spanning no more than 300 kilometers, and passing at least most of the plurality of wavelengths through a multiple stage optical amplifier capable of operating on a bandwidth of at least 60 nanometers. The multiple stage optical amplifier offsets at least a portion of a loss experienced by the multiple wavelength optical signal as it traverses the communication link.

In still another method embodiment, a method of communicating optical signals in a metropolitan area network comprises generating a plurality of optical wavelength signals, each of the plurality of optical wavelength signals comprising a transport rate of at least 9.5 gigabits per second. The method also comprises combining at least some of the plurality of wavelength signals into a multiple wavelength optical signal, and communicating the multiple wavelength optical signal over a communication link in a metropolitan area network spanning no more than 300 kilometers. The method further comprises passing the multiple wavelength optical signal over a dispersion compensating fiber to at least partially compensate for a dispersion experienced by at least a portion of the multiple wavelength optical signal. In addition, the method comprises pumping the dispersion compensating fiber to produce Raman gain to at least partially offset a loss associated with the dispersion compensating fiber.

Various embodiments of the present invention provide various technical advantages. For example, one aspect of this disclosure envisions metropolitan systems utilizing large numbers of channels and large numbers of interface devices to accommodate routing and processing of varying traffic patterns through the network. These interface devices can, in some cases, be quite lossy. One aspect of this disclosure proposes using Raman amplifiers to render at least a portion of the transmission medium lossless or better, effectively creating extra system margin, which can be utilized to offset losses associated with numerous interface devices.

Moreover, some aspects of this disclosure contemplate a metropolitan system utilizing numerous, possibly hundreds, of channels or more to facilitate efficient signal routing on a dedicated or semi-dedicated wavelength basis. That is, various network destinations may be associated with particular wavelengths, essentially creating dedicated links by allocating particular wavelengths to particular network nodes. In such a system, the number of channels used will increase dramatically compared to conventional systems. Amplifier technologies, such as Erbium doped amplifiers, are currently ill equipped to process the number of wavelengths that will be needed. This disclosure seeks to leverage the wavelength agnostic nature of Raman amplifiers to provide wide bandwidth operation, capable of amplifying many channels in a metro-optic network.

Still other aspects of this disclosure recognize that dispersion compensation can be provided for the metropolitan network using a Raman amplifier having a dispersion compensating fiber that serves as at least a portion of its gain medium. In that case, a single element can serve as both an amplification element, and a dispersion compensating element.

Other technical advantages may be readily ascertained by those skilled in the art from the following figures, description, and claims.

BRIEF DESCRIPTION OF THE DRAWINGS

For a more complete understanding of the present invention and the advantages thereof, reference is now made to the following description, taken in conjunction with the accompanying drawings, wherein like reference numerals represent like parts, in which.

DETAILED DESCRIPTION OF EXAMPLE EMBODIMENTS

Figure 1:
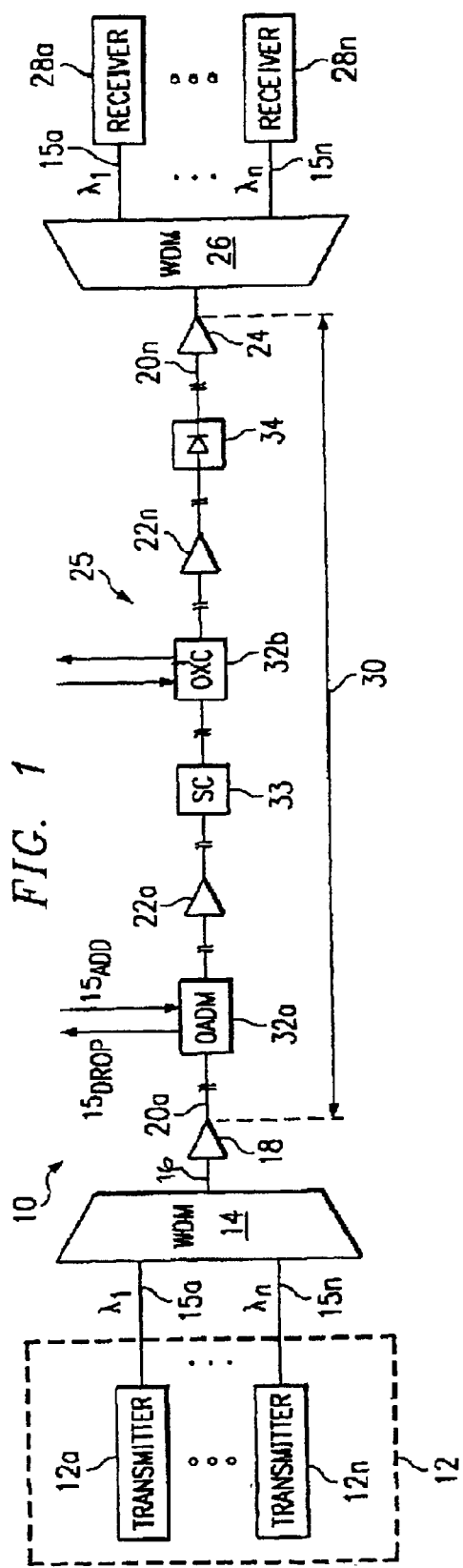
FIG. 1 illustrates a simplified block diagram of a fiber optic transmission system.

FIG. 1 is a block diagram showing at least a portion of an exemplary optical communication system 10 operable to facilitate communication of one or more multiple wavelength signals in a metropolitan area network. In some embodiments, system 10 may comprise the entire metropolitan optical communication system from beginning to end. In other embodiments, system 10 may comprise a portion of a larger optical communication system such as a ring, a mesh, or other network configuration. In those embodiments, elements shown as containing transmitters and/or receivers could comprise optical regenerators residing within a larger multiple link communication system.

In this example, system 10 includes a transmitter assembly 12 operable to generate a plurality of optical signals (or channels) 15a–15n, each comprising a center wavelength of light. In some embodiments, each optical signal 15a–15n can comprise a center wavelength that is substantially different from the center wavelengths of other signals 15. As used throughout this document, the term "center wavelength" refers to a time-averaged mean of the spectral distribution of an optical signal. The spectrum surrounding the center wavelength need not be symmetric about the center wavelength. Moreover, there is no requirement that the center wavelength represent a carrier wavelength.

All or a portion of transmitter assembly 12 could reside, for example, within a transponder capable of transmitting and receiving information. In one embodiment, transmitter assembly 12 comprises a plurality of independent pairs of optical sources and associated modulators. Alternatively, transmitter assembly 12 could comprise one or more optical sources capable of generating a plurality of optical signals and shared by a plurality of modulators. For example, transmitter assembly 12 could comprise a continuum source transmitter including a mode-locked source operable to generate a series of optical pulses and a continuum generator operable to receive a train of pulses from the mode-locked source and to spectrally broaden the pulses to form an approximate spectral continuum of optical signals. In that embodiment, a signal splitter receives the continuum and separates the continuum into individual signals each having a center wavelength. In some embodiments, transmitter assembly 12 can also include a pulse rate multiplexer, such as a time division multiplexer, operable to multiplex pulses received from the mode-locked source or the modulator to increase the bit rate of the system.

Transmitters 12 in system 10 comprise devices capable of converting an electrical signal into an optical wavelength. Transmitters 12 can receive electrical signals generated, for example, by source devices initiating communications. In other examples, transmitters 12 could receive electrical signals from receivers associated with transmitters 12. In that case, transmitters 12 and their associated receivers could serve as optical regenerators residing within a multiple link communication system.

In one embodiment, one or more transmitters, such as transmitter 12a may comprise electro-absorption modulated lasers (EML). Others of transmitters 12 may include EMLs or other types of optical sources such as other externally modulated light sources or directly modulated light sources. Transmitter 12a may include a laser diode and an electro-absorption modulator (EAM) located on a common substrate. Locating the laser diode and the EAM on a common substrate is advantageous in allowing relatively inexpensive packaging of EMLs by facilitating formation of arrays of EMLS. In some embodiments, transmitter 12a may include an EML with forward error correction (FEC) capabilities. Using a FEC technique in system 10 provides an advantage of improving tolerance to errors in optical signal 15a. EMLs may modulate information onto optical signals at rates up to 9.5 gigahertz per second or more.

In the illustrated embodiment, system 10 also includes a combiner 14 operable to receive a plurality of optical signals 15a–15n and to combine those signals into a multiple wavelength signal 16. As one particular example, combiner 14 could comprise a wavelength division multiplexer (WDM). The terms wavelength division multiplexer and wavelength division demultiplexer as used herein may include equipment operable to process wavelength division multiplexed signals and/or equipment operable to process dense wavelength division multiplexed signals.

In the illustrated embodiment, wavelength signals 15a–15n comprise a bandwidth of wavelengths of at least forty (40) nanometers. In some embodiments, wavelength signals 15a–15n can comprise a bandwidth of more than sixty (60) nanometers, or even more than eighty (80) or one hundred (100) nanometers. In this example, wavelength signals 15a–15n comprise at least one hundred sixty (160) channels. In some embodiments, wavelength signals 15a–15n can comprise more than two hundred (200) or even more than two hundred-forty (240) channels. For a broadband system implementation, it is contemplated that there are over 160 wavelengths collectively occupying a bandwidth of at least 80 nm.

System 10 communicates multiple wavelength signal 16 over an optical communication medium 20. Communication medium 20 can comprise a plurality of spans 20a–20n of fiber, each coupled to or comprising an optical amplifier. In some embodiments all or a portion of a span can serve as a distributed amplification stage. Fiber spans 20a–20n could comprise standard single mode fiber (SMF), dispersion-shifted fiber (DSF), non-zero dispersion-shifted fiber (NZDSF), or another fiber type or combination of fiber types.

Two or more spans of communication medium 20 can collectively form a fiber optic transmission link 25. In the illustrated example, communication medium 20 includes a single optical link 25 comprising numerous spans 20a–20n. System 10 could include any number of additional links coupled to link 25. For example, optical link 25 could comprise one optical link of a multiple link system.

In the illustrated embodiment, system 10 comprises an optical system that communicates signal 16 over optical link 25 a link distance 30. In the preferred embodiment, link distance 30 is a distance of less than 300 km representing a metropolitan area network. Link distance 30 refers to the maximum length in a fiber optic transmission system, or the length of one link in a multiple link system between regenerators.

Although in this example optical link 25 comprises a length of no more than 300 kilometers, optical link 25 could couple to other networks facilitating communication beyond 300 kilometers. For example, optical link 25 could couple to another optical network or to an electrical network through, for example, a switch, cross connect, router, or other signal directing device. The other network could comprise, for example, an additional metro network, a long-haul network, or an ultra long-haul network.

In this example, system 10 includes a booster amplifier 18 operable to receive and amplify wavelengths of signal 16 in preparation for transmission over a communication medium 20. Where communication system 10 includes a plurality of fiber spans 20a–20n, system 10 can also include one or more in-line amplifiers 22a–22n. In-line amplifiers 22 couple to one or more spans 20a–20n and operate to amplify signal 16 as it traverses communication medium 20. Optical communication system 10 can also include a preamplifier 24 operable to amplify signal 16 received from a final fiber span 20n. Although optical link 25 is shown to include one or more booster amplifiers 18, in-line amplifiers 22, and preamplifiers 24, one or more of these amplifier types could be eliminated in other embodiments.

Throughout this document, the term "amplifier" denotes a device or combination of devices operable to at least partially compensate for at least some of the losses incurred by signals while traversing all or a portion of optical link 25. Likewise, the term "amplification" refers to offsetting at least a portion of losses that would otherwise be incurred.

An amplifier may, or may not, impart a net gain to a signal being amplified. Moreover, the term "gain" as used throughout this document, does not (unless explicitly specified) require a net gain. In other words, it is not necessary that a signal experiencing "gain" or "amplification" in an amplifier stage experiences enough gain to overcome all losses in the amplifier stage. As a specific example, distributed Raman amplifier stages typically do not experience enough gain to offset all of the losses in the transmission fiber that serves as a gain medium. Nevertheless, these devices are considered "amplifiers" because they offset at least a portion of the losses experienced in the transmission filter. An example amount of gain that may be provided by a Raman amplifier is 5 decibels and an efficiency noise figure of less than 8 decibels.

Amplifiers 18, 22, and 24 could each comprise, for example, a discrete Raman amplifier, a distributed Raman amplifier, a rare earth doped amplifier such as an erbium doped or thulium doped amplifier, a semiconductor amplifier or a combination of these or other amplifier types. In this example, at least one amplifier in system 10 comprises at least one Raman amplification stage.

System 10 may further include one or more interface devices. For example, system 10 may include interface devices comprising one or more access elements 32 such as an optical add/drop multiplexer, an optical cross-connect, or another device operable to terminate, cross-connect, switch, route, process, and/or provide access to and from optical link 25 and another optical link or communication device.

Signal conditioning devices 33 provide another example of interface devices that could be used in system 10. For example, signal conditioning devices 33 could include a gain equalizer, a variable optical attenuator, a signal to noise ratio booster, a dispersion compensation element, a filter, and/or a polarization mode dispersion compensator.

Lossy elements provide still another example of interface devices. System 10 may include one or more lossy elements 34 coupled between spans 20 of optical link 25. Isolators, taps, couplers, wavelength division multiplexers, and pump dumps provide just a few examples of lossy elements that might reside within system 10.

One aspect of this disclosure envisions metropolitan systems utilizing large numbers of channels and large numbers of interface devices to accommodate routing and processing of varying traffic patterns through the network. Metropolitan area networks being developed will likely implement large numbers of channels, which will need to be directed on and off of communication link 20 at numerous locations. Each one of these locations will typically include an interface device of some sort. At least some of these devices can be quite lossy. In some cases, the cumulative loss of the interface devices can comprise six (6) decibels or more. In other cases, one or more of the interface devices could comprise a loss of, say, six (6) decibels or more. One aspect of this disclosure envisions using Raman amplifiers to render at least a portion of the transmission medium lossless or better, effectively creating extra system margin, which can be utilized to offset losses associated with numerous interface devices.

Where system 10 includes a plurality of optical add/drop multiplexers (OADMs) 32a, one or more of OADMs 32a could comprise channel-by channel OADMs operable to add and/or drop one individual channel from optical link 25. In addition, or alternatively, one or more of OADMs 32a could also, or alternatively, comprise band OADMs operable to approximately simultaneously add and/or approximately simultaneously drop a plurality of channels. OADMs 32a can facilitate, for example removing channels from optical link 25 for termination at a node local to link 25 and/or adding channels to optical link created at a node local to optical link 25. Moreover, OADMs 32a can facilitate adding traffic to optical link from another communication link or removing traffic from optical link 25 for routing to another communication link.

In one embodiment, system 10 comprises a plurality of OADMs, each OADM operable to remove one or more wavelength signals $15_{DROP}$ from multiple wavelength signal 16 and to add one or more wavelength signals $15_{ADD}$ to multiple wavelength signal 16. Each OADM 32a may comprise any hardware, software, firmware, or combination thereof. In various embodiments, at least some OADMs 32a may comprise static OADMs capable of adding/dropping a predetermined wavelength or wavelengths. In other embodiments, at least some OADMs 32a may comprise tunable OADMs capable of adding/dropping dynamically selectable wavelengths. In one particular embodiment, each OADM 32a could comprise, for example, a low loss thin film filter.

As one example, OADMs 32a may reside mid-stage within a multiple stage in-line amplifiers 22a. Although OADMs 32a can reside anywhere in system 10, locating an OADM mid-stage in an in-line amplifier provides an advantage of reducing noise and non-linearity penalties. For example, if an OADM was placed prior to a first amplification stage 22a, losses would be introduced prior to amplification. In that embodiment, any noise introduced by the OADM would be amplified, degrading the optical signal-to-noise ratio. If an OADM was placed after the final amplification stage 22n, non-linearity penalties could result. In one embodiment, the OADM is advantageously located after the first stage of the multiple stage in-line amplifier 22a and before the last stage of in-line amplifier 22a. This helps to avoid degrading the optical signal-to-noise ratio and reduces non-linearity penalties.

Not all OADMs 32a in system 10 need be operational at any given time. Moreover, not all OADMs 32a need to add and/or drop signals at their full capacities at all times. For example, some OADMs 32a can be installed in system 10, but may be incapable of providing full, or any, add/drop functionality. This may be advantageous, for example, where traffic demands do not, at the time of installation, warrant add/drop functionality at a given network location, but where it is envisioned that add/drop functionality may someday be desired at that location.

System 10 also includes a separator 26 operable to separate individual optical signal 15a–15n from multiple wavelength signal 16. Separator 26 can communicate individual signal wavelengths or ranges of wavelengths to a bank of receivers 28 and/or other optical communication paths. Separator 26 may comprise, for example, a wavelength division demultiplexer (WDM). Receivers 28a–28n receive respective signals 15a–15n for decoding in order to recover the original signal.

Metropolitan area networks can comprise, for example, regional networks that span less than 300 km in total extent or in length between regenerators. Designers of metropolitan area networks are typically more cost conscious than designers of long haul or ultra long haul networks. Raman amplifiers have often been considered to be a costly add on for a network and, consequently have typically been reserved for long haul networks and ultra long haul networks. Conventional wisdom views Raman amplification as primarily useful in extending the distance for fiber optic transport. Since long distance transport has not been associated with the shorter length metropolitan area networks, metro network designers have largely ignored Raman amplifiers.

Figure 2B:
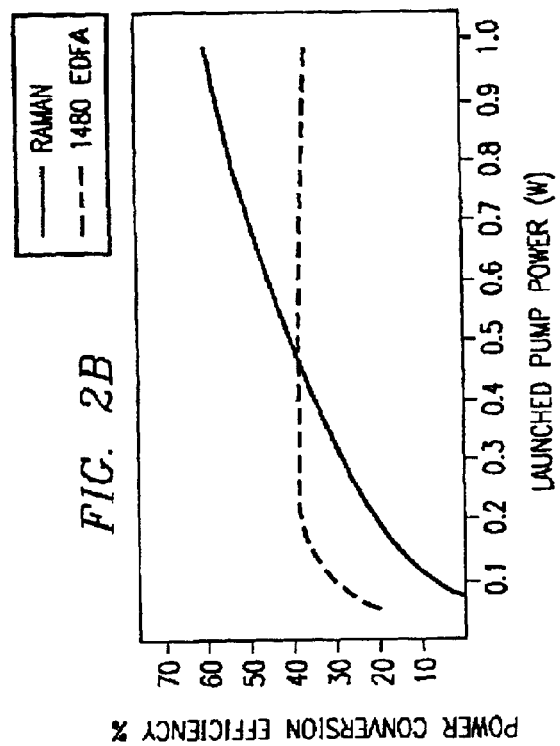
FIGS. 2A–B illustrate power conversion efficiency graphs comparing Raman amplifiers with erbium doped fiber amplifiers.
Figure 2A:
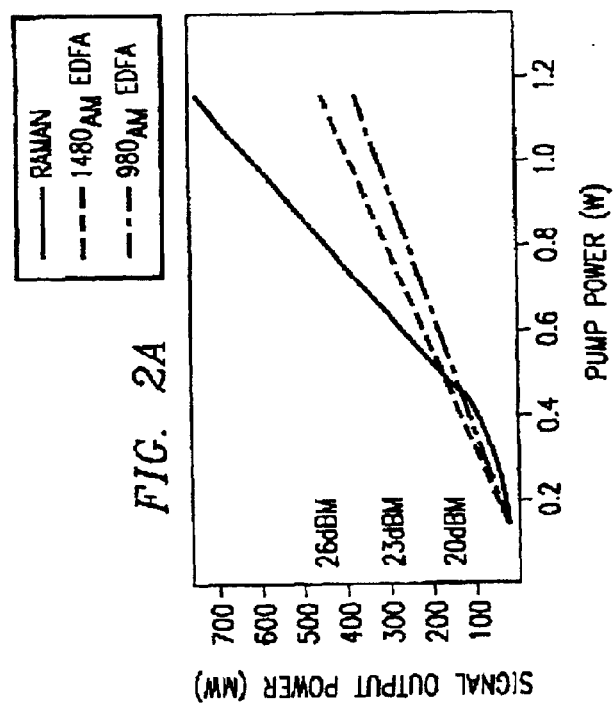

FIGS. 2A–2B show a graph of the power conversion efficiencies for various amplifier types. In this case, the efficiency of the amplifier is defined as the ratio of the signal power output from the amplifier to the pump power input to the amplifier. For a system having 1 mW output power per wavelength, as the number of wavelengths desired for system 10 increases, the signal output power for an erbium doped fiber amplifier increases in a constant linear fashion. However, the increase in the signal output power for a Raman amplifier increases more dramatically as the number of wavelengths increases. There is a point where a Raman amplifier is more efficient than an erbium doped amplifier. This point is reached at about 160 wavelengths when compared to a 980 nm erbium doped fiber amplifier and about 200 wavelengths when compared to a 1480 nm erbium doped fiber amplifier. Thus, since this disclosure envisions metropolitan area networks utilizing many wavelengths, it is anticipated that there is a point not previously realized where a Raman amplifier provides better efficiency in a metropolitan area network than the conventional use of an erbium doped fiber amplifier in a metropolitan area network.

Metropolitan area networks will evolve to require a good deal of margin as there will be more optical add/drop multiplexers, a future need to use optical cross-connects, and more signal conditioning devices to handle dynamic applications. Also, there are many source and destination sites in a metropolitan area network and every site or at least many sites may seek to have their own wavelength. In that case, a metropolitan area network will require many wavelengths, typically in excess of 160 wavelengths. As broadband systems become increasingly popular, the bandwidth requirements for a metropolitan area network may exceed 60 nm, 80 nm or more. Higher speed transports are also coming into vogue, including rates such as 9.5 gigabits per second and 35 gigabits per second, to simplify multiplexing and demultiplexing operations.

In order to conserve margin in metropolitan area in networks, Raman amplification may be used though it has been previously shied away from in metropolitan area network designs. The margin provided by Raman amplification has typically been used for distance purposes in long haul and ultra long haul networks. For metropolitan area networks, the margin provided by Raman amplification may instead be used to at least partially compensate for losses due to insertion of access elements, signal conditioning devices, and/or lossy elements into the optical link. These amplifiers can further compensate, at least partially, for losses due to providing a large number of wavelengths and an increased bandwidth, and losses associated with increased transport speeds.

For metropolitan area networks with many access elements, signal conditioning devices, and/or lossy elements on the optical link, which may collectively or individually provide insertion losses of greater than 6 decibels, the additional margin provided by Raman amplification can at least partially offset these insertion losses. For two or more access elements, or two or more signal conditioning devices or a combination of at least an access element and a signal conditioning device, with combined insertion losses of 6 decibels or greater, Raman amplification can offset such losses for a metropolitan area network.

A distributed Raman amplifier provides enhanced gain performance and better noise figures than conventional amplifiers used in metropolitan area networks. A distributed Raman amplifier effectively makes part of communication medium 20 transparent, or can be configured to provide a net gain. This additional margin allows for more interface devices to be coupled to communication medium 20 to allow more optical signals to enter and exit communication medium 20. Thus, Raman amplification is an effective technique in a metropolitan area network to handle more interface devices coupled to the communication medium.

In metropolitan area networks that support a large number of wavelengths with higher bandwidths as in a broadband environment, the Raman amplification can be used to provide a wide bandwidth of amplification. Destinations in a metropolitan area network would desirably want their own wavelength to receive and send optical signals. In order to provide destinations with their own wavelength, more bandwidth is needed to maintain spacing between wavelengths. It is contemplated that this type of broadband system would encompass more than 160 wavelengths with bandwidths of at least 80 nm.

A Raman amplifier is wavelength agnostic and, thus, can provide the larger bandwidth that conventional types of amplifiers used in metropolitan area networks are unable to provide. In some cases a multiple stage Raman amplifier can be implemented that reduces, at least in part, double Rayleigh scattering problems in such a system. By keeping inter-channel spacing large (e.g., 100 gigahertz or higher), less expensive components can be easily used.

Various embodiments of Raman amplifiers, or hybrid amplifiers comprising at least one Raman amplification stage can provide effective wide bandwidth amplification. Wide band amplifiers described herein can be capable of amplifying, for example, more than 40 nanometers, in some cases more than 60, 80 or even more than 100 nanometers of bandwidth without the use of signal separators and combiners surrounding parallel combinations of amplifiers.

FIGS. 3 and 4 illustrate example embodiments of amplifiers capable of amplifying relatively large bandwidths. In various embodiments, system 10 of FIG. 1 may implement one or more of the amplifiers described below. Although FIGS. 3 and 4 describe particular examples of wider band amplifiers, other amplifier designs can be implemented without departing from the scope of this disclosure. The amplifier designs described with respect to FIGS. 3 and 4 are for illustrative purposes only. Moreover, although these examples depict single amplifiers operable to amplify all signal wavelengths, a plurality of these wider band amplifiers could be used in parallel to further increase the amplifying bandwidth of the system. Moreover, although the embodiments shown in FIGS. 3 and 4 show two complementary amplification stages, additional complementary amplification stages could also be implemented.

Figure 3A:
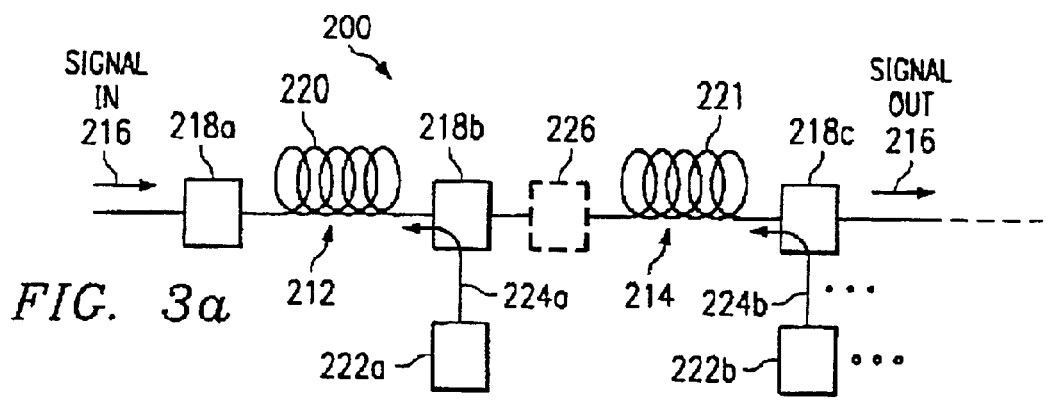
FIGS. 3A–C illustrate example embodiments of amplifiers capable of amplifying relatively large bandwidths.
Figures 3B, 3C:
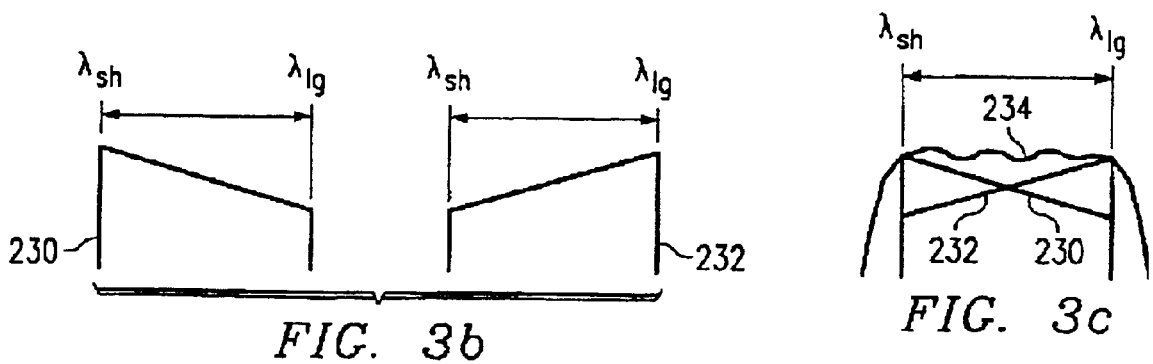

FIGS. 3A through 3C illustrate an example multiple stage amplifier 200 with a plurality of gain profiles 230 and 232 associated with various amplification stages and an overall gain profile 234 for the amplifier. In this particular example, amplifier 200 is capable of amplifying at least 180 channels, in some embodiments more than 240 channels, spanning 100 nanometers or more of bandwidth. At the same time, amplifier 200 maintains an acceptable signal-to-noise ratio and an approximately flat gain profile. Any other number of channels and/or bandwidths may be used without departing with the scope of this disclosure.

Conventional designs of multi-stage amplifiers have experienced difficulties in attempting to process wide bandwidths with a signal amplifier while maintaining approximately flat gain profiles, acceptable noise figures, or acceptable bit error rates. For example, in Raman amplifiers, a major culprit in noise figures is the phonon-stimulated optical noise created when wavelength signals being amplified reside spectrally close to pump wavelengths used for amplification. The embodiment shown in FIG. 3A reduces adverse effects of this noise by enhancing the Raman amplification of signal wavelengths near the pump wavelengths to overcome the effects of the noise. This embodiment applies an approximately complementary gain profile in another stage of the amplifier to result in an approximately flat overall gain profile with a reduced noise figure.

In this document, the phrase "approximately complementary" refers to a situation where, at least in general, wavelength signals that are more highly amplified in a first stage are less amplified in a second complementary stage, and wavelength signals that are more highly amplified in the second stage are less amplified in the first stage. Note that the use of the terms "first" and "second" to describe the amplifier stages here is not meant to specify any particular order of stages in the amplifier. In addition, two gain profiles said to be "approximately complementary" need not have equal and opposite slopes. Moreover, equal amplification of any particular wavelengths in both gain profiles does preclude those gain profiles from being "approximately complementary."

Approximately complementary gain profiles may have one or more slopes associated with each gain profile. For example, approximately complementary gain profiles could comprise a "W" shaped profile followed by an "M" shaped profile, or an "M" shaped profile followed by a "W" shaped profile. Furthermore, the approximately complementary gain profiles may become approximately complementary only after traversing all or a portion of the transmission medium. In those cases, the gain profiles launched at the beginning of the amplifier stage may not be approximately complementary, but may become approximately complementary after signals traverse all or a portion of the transmission medium.

While better results could be obtained by applying approximately complementary gain profiles to all or nearly all of the same signal wavelengths, some portion of wavelengths can be omitted from one gain profile and included in the other gain profile without departing from the scope of this disclosure.

In this example, amplifier 200 comprises a two-stage amplifier having a first stage 212 and a second stage 214 cascaded with first stage 212. There is no limit to a particular number of amplifier stages. For example, additional amplification stages could be cascaded onto second stage 214. Moreover, although the illustrated embodiment shows second stage 214 cascaded directly to first stage 212, additional amplification stages could reside between first stage 212 and second stage 214 without departing from the scope of this disclosure.

Amplifier 200 could comprise a distributed Raman amplifier, a discrete Raman amplifier, a hybrid Raman amplifier having both discrete and distributed stages, a rare earth doped amplifier, a semiconductor optical amplifier, or another amplifier type or combination of amplifier types. Each stage 212, 214 of amplifier 200 includes an input operable to receive a multiple wavelength optical input signal 216. As particular examples, signal 216 could include wavelengths ranging, for example, over 32 nanometers or more, 40 nanometers or more, 60 nanometers or more, 80 nanometers or more, or 100 nanometers or more.

Each stage 212 and 214 also includes a gain medium 220 and 221, respectively. Depending on the type of amplifier being implemented, media 220 and 221 may comprise, for example, a gain fiber or a transmission fiber. In some embodiments, all or portions of media 220, 221 may comprise dispersion compensating fibers.

Each stage 212, 214 further includes one or more wavelength pumps 222. Pumps 222 generate pump signals 224 at specified wavelengths, which are pumped into distributed gain media 220, 221. Pumps 222 may comprise, for example, one or more laser diodes. Although the illustrated embodiment shows the use of counter propagating pumps, under at least some circumstances using a relatively quiet pump, co-propagating pumps could also or alternatively be used without departing from the scope of the disclosure.

In one particular embodiment, pump signals 224 can be selected so that the longest wavelength of pump signals 224 has a wavelength that is shorter than the shortest wavelength of signal 216. As one specific example, the longest wavelength of pump signals 224 could be selected to be, for example, at least ten (10) nanometers shorter than the shortest wavelength of signal 216. In this manner, amplifier 200 can help to avoid phonon stimulated noise that otherwise occurs when pump wavelengths interact with wavelengths of the amplified signal.

Couplers 218b and 218c couple pump signals 224a and 224b to gain distributed media 220 and 221, respectively. Couplers 218 could comprise, for example, wavelength division multiplexers or optical couplers. A lossy element 226 can optionally reside between amplifier stages 212 and 214. Lossy element 226 could comprise, for example, an isolator, an optical add/drop multiplexer, or a gain equalizer.

The number of pump signals 224, their launch powers, their spectral and spatial positions with respect to other pump wavelengths and other wavelength signals, and the bandwidth and power level of the signal being amplified can all contribute to the shape of the gain profile for the respective amplifier stage.

FIG. 3B shows example gain profiles 230 and 232 for the first stage 212 and the second stage 214, respectively, of amplifier 200. Gain profile 230 shows the overall gain of first stage 212 of amplifier 200 for a bandwidth ranging from the shortest wavelength of signal 216 ($\lambda_{sh}$) to the longest wavelength of signal 216 ($\lambda_{lg}$). Gain profile 232 shows the overall gain of second stage 214 of amplifier 200 for a bandwidth ranging from the shortest wavelength of signal 216 ($\lambda_{sh}$) to the longest wavelength of signal 216 ($\lambda_{lg}$). Each of gain profiles 230 and 232 reflects the effects of the other gain profile acting upon it.

In this example, gain profile 230 of first stage 212 has primarily a downward slope, where a majority of the shorter wavelength signals 216 are amplified more than a majority of the longer wavelength signals 216. Gain profile 232 of second stage 214 is approximately complementary to gain profile 230 of first stage 212. In this case, gain profile 232 exhibits primarily an upward slope where a majority of the longer wavelength signals 216 are amplified more than a majority of the shorter wavelength signals 216.

Although gain profiles 230 and 232 are, for simplicity, depicted as each having substantially one slope, the slope of each gain profile may change numerous times. Moreover, it is not necessary that the entire slope of gain profile 230 be negative, or that the entire slope of gain profile 232 be positive. Each profile may exhibit any number of peaks and valleys over the amplified bandwidth.

Gain profile 234 in FIG. 3C represents an example overall gain profile of amplifier 200 resulting from the application of gain profiles 230 and 232 to signal 216. Overall gain profile 234 is approximately flat over at least substantially all of the bandwidth of wavelengths within signal 216.

This particular example provides a significant advantage in reducing the peak noise figure associated with the amplifier using complementary gain profiles. The complementary gain profiles reduce the peak noise figure by amplifying signals closest to the pump wavelengths at higher levels the signals at wavelengths far from the pump wavelengths. In addition, the noise figure is reduced by amplifying longer wavelength signals in a later amplifier stage. Moreover, implementing varying launch powers reduces the total launched signal power, which, in Raman amplifiers, reduces noise generated from the signal-signal interactions. In a discrete amplifier embodiment, using this type of configuration, the noise figure of amplifier 200 in the small signal limit can be reduced to less than eight decibels, in some cases 7 decibels, even where the bandwidth of signal 216 exceeds 100 nanometers.

Complementary gain profiles can also be used to reduce the pump power requirements for a given amplifier, thus creating a high efficiency amplifier.

Figure 4A:
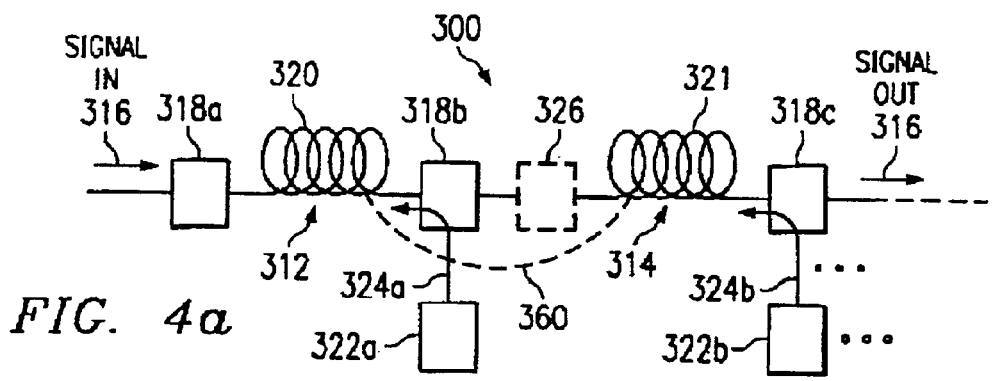
FIGS. 4A–C illustrate additional example embodiments of amplifiers capable of amplifying relatively large bandwidths.
Figures 4B, 4C:
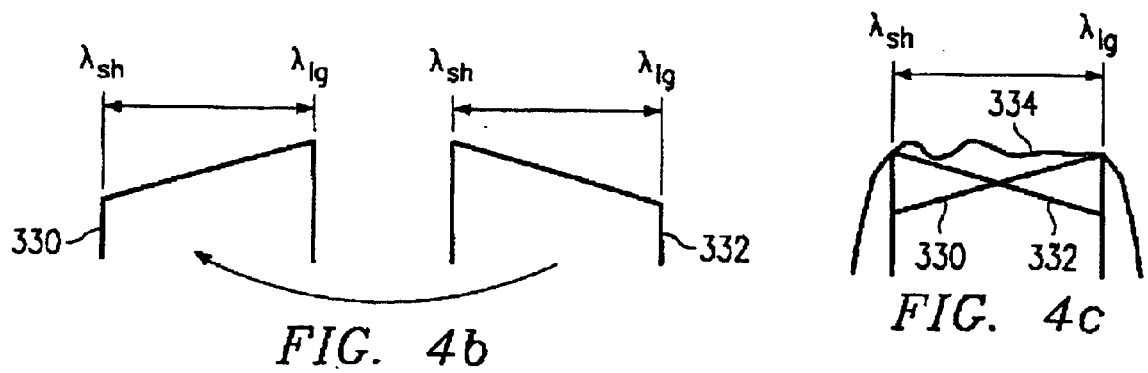

FIGS. 4A through 4C illustrate a high pump efficiency embodiment of a multiple stage wide band amplifier 300 including example gain profiles 330 and 332 associated with various amplification stages and an overall gain profile 334 for the amplifier. In this example, amplifier 300 is capable of amplifying at least 180 channels spanning 100 nanometers or more of bandwidth while maintaining an acceptable signal-to-noise ratio and an approximately flat gain profile.

Amplifier 300 shown in FIG. 4A is similar in structure and function to amplifier 200 shown in FIG. 3A. Like amplifier 200 shown in FIG. 3A, amplifier 300 of FIG. 4A includes a first amplification stage 312 and a second amplification stage 314. Each of stages 312 and 314 includes a gain medium 320 and 321, respectively, which is operable to receive multiple wavelength input signal 316 and pump wavelengths 324a and 324b, respectively.

Each amplifier stage 312 and 314 operates to amplify wavelengths of input signal 316 by applying gain profiles 330 and 332 as shown. In this example, at least first stage 312 comprises a Raman amplification stage. Second stage 314 could comprise a Raman amplification stage, or another type of amplification stage.

The example shown in FIG. 4 differs from the example shown in FIG. 3 in that gain profile 330 (shown in FIG. 4B) of first stage 312 exhibits primarily an upward slope where a majority of longer wavelengths of signal 316 are amplified more than the majority of shorter wavelengths of signal 316. Conversely, gain profile 332 of second stage 314 comprises an approximately complementary gain profile to first gain profile 330 of first stage 312. Profile 332 applies a higher gain to a majority of shorter wavelength signals 316 than the gain applied to the majority of longer wavelength signals 316. In addition, in this embodiment, the power of pumps 322a driving first gain profile 330 can be reduced.

The Raman scattering effect transfers energy from shorter wavelength signals 316 to longer wavelength signals 316. This embodiment leverages that fact to allow the longer pump wavelengths of Raman first stage 312 to accept energy from the shorter pump wavelengths of second stage 314. In a particular embodiment, amplifier 300 may include a shunt 360 between second gain medium 321 and first gain medium 320 to facilitate the longer pump wavelengths of first stage 312 accepting power from the shorter pump wavelengths of second stage 314. The combined effects of first stage 312 and second stage 314 result in an overall gain profile 334 (FIG. 4C) of the amplifier that remains approximately flat.

This embodiment provides significant advantages in terms of efficiency by allowing the use of fewer wavelength pumps 322a in the first stage 312, and/or also by allowing each pump 322a to operate at a lower launch power. By selecting signal launch powers with reference to the noise figure of the amplifier, this embodiment enjoys the further efficiency of reduced overall launched signal power.

The embodiment shown in FIG. 4A can also provide improvements for the noise figure of the amplifier. For example, phonon stimulated noise is created in Raman amplifiers where wavelengths being amplified spectrally reside close to a wavelength of pump signals 324. By spectrally separating pump wavelengths 324 from wavelength signals 316, phonon stimulated noise can be reduced.

In a particular embodiment, pump wavelengths 324 are selected to have wavelengths at least ten (10) nanometers shorter than the shortest wavelength in signal 316 being amplified. Moreover, in a particular embodiment, second stage 314, where a majority of the gain to short wavelengths of signal 316 is applied, comprises the last stage of amplifier 300.

The amplifiers depicted in FIGS. 3 and 4 can comprises wide band amplifiers operable to receive and amplify a relatively large bandwidth of wavelength signals. In particular embodiments, the amplifiers can process wavelengths ranging over 32, 40, 60, 80, or 100 nanometers of bandwidth while maintaining an approximately flat overall gain profile over the bandwidth of amplified wavelength signals 16.

In this document, the term "approximately flat overall gain profile" describes a condition where the maximum signal gain at the output of the amplifier differs from the minimum signal gain at the output of the amplifier by no more than an amount suitable for use in telecommunication systems over an operational bandwidth of information carrying channels. Deviation of the maximum and minimum signal gain over one or two of several channels is not intended to be outside of the scope of an approximately flat overall gain profile. The deviation between minimum and maximum signal gains may comprise, for example, five (5) decibels prior to application of any gain flattening filters over an operational bandwidth of, for example, 32 nanometers or more. Particular embodiments may achieve gain flatness of approximately three (3) decibels or less before application of any gain flattening filters over an operational bandwidth.

Some embodiments may also, or alternatively, implement one or more dispersion compensation devices to reduce penalties due to chromatic dispersion. System 10 can implement one or more lengths of dispersion compensating fiber as a dispersion compensation technique. In one embodiment, the dispersion compensating fiber can serve as at least a portion of a gain medium in a distributed or discrete Raman amplification stage. In this manner, losses introduced by the dispersion compensating fiber can be at least partially offset by pumping that fiber to generate Raman gain (which may or may not result in a net gain).

In a conventional metropolitan area network, transport rates are typically 2.5 gigabits per second or less. Where higher transport rates are desired, as in at least a 9.5 gigabits per second rate, the transport of optical signals is limited by dispersion as it becomes undesirable to have the broadening of the pulse of the optical signal. Dispersion compensation may be used with Raman amplification, preferably in a single unit, to at least partially offset a loss introduced into the system by the dispersion compensation in order to facilitate this high transport rate. It may be also desirable to provide dispersion management on a span by span basis. Dispersion compensation may be provided at least in part by a dispersion compensation fiber. Moreover, Raman gain may be used in the dispersion compensation fiber to at least partially offset the loss introduced by the dispersion compensation fiber. Thus, Raman amplification becomes an effective tool for metropolitan area networks desiring higher transport rates.

Although the present invention has been described in detail, various changes, substitutions, and alterations may be readily ascertainable by those skilled in the art. For example, though several metropolitan area network embodiments are described, it is contemplated that a metropolitan area network may encompass more than one of the features described above. Other examples may be readily ascertainable by those skilled in the art and may be made herein without departing from the spirit and scope of the present invention as defined by the following claims.

What is claimed is:

1. A fiber optic transmission system for a metropolitan area network, comprising:
    a plurality of interface devices operable to be coupled to a fiber optic transmission link in a metropolitan area network, the fiber optic transmission link carrying an optical signal and having a length of 300 km or less, wherein the link comprises a transmission loss associated with an unpumped state, and wherein the plurality of interface devices collectively introduce a loss of at least 6 decibels to the link; and
    a distributed Raman amplifier stage coupled to the link, the distributed Raman amplifier stage operable to pump at least a portion of the link to reduce the transmission loss of the at least a portion of the link compared to its unpumped state, the reduced link transmission loss facilitating allocation of at least a portion of a gain to at least partially offset the loss associated with the plurality of interface devices.

2. The system of claim 1, wherein the distributed Raman amplifier stage entirely compensates for the loss introduced to the fiber optic transmission link by the plurality of interface devices.

3. The system of claim 1, wherein the distributed Raman amplifier stage provides a net gain to at least a portion of the optical signal.

4. The system of claim 1, wherein the distributed Raman amplifier stage provides at least a 5 decibel gain to the optical signal.

5. The system of claim 1, wherein the distributed Raman amplifier provides an effective noise figure of less than 8 decibels.

6. The system of claim 1, wherein the plurality of interface devices include at least one optical add/drop multiplexer unit to provide access to the fiber optic transmission link for an optical communication device.

7. The system of claim 1, wherein the plurality of interface devices include at least one optical cross connect unit to provide access to the fiber optic transmission link for an optical communication device.

8. The system of claim 1, wherein the plurality of interface devices includes at least one signal conditioning device.

9. The system of claim 8, wherein the at least one signal conditioning device comprises a device selected from a group consisting of a gain equalizer, a variable optical attenuator, a signal to noise ratio booster, a dispersion compensation element, a filter, and a polarization mode dispersion compensator.

10. The system of claim 1, wherein the plurality of interface devices includes at least one lossy element.

11. The system of claim 10, wherein the at least one lossy element comprises an element selected from a group consisting of an isolator, a tap, a coupler, a wavelength division multiplexer, and a pump dump.

12. The system of claim 1, wherein the distributed Raman amplifier stage is part of a multiple stage amplifier design.

13. The system of claim 12, wherein the multiple stage amplifier design includes a discrete Raman amplifier stage.

14. The system of claim 1, wherein the optical signal comprises a multiple wavelength signal comprising more than 160 wavelengths.

15. The system of claim 14, wherein the multiple wavelength signal occupies a bandwidth of at least 40 nm.

16. The system of claim 14, wherein the multiple wavelength signal occupies a bandwidth of at least 60 nm.

17. The system of claim 14, wherein the multiple wavelength signal occupies a bandwidth of at least 80 nm.

18. The system of claim 1, wherein the optical signal comprises a multiple wavelength signal comprising more than 200 wavelengths.

19. The system of claim 1, wherein the fiber optic transmission link operates at a transport rate of at least 9.5 gigabits per second.

20. The system of claim 19, wherein the fiber optic transmission link includes a dispersion compensating element operable to at least partially compensate for a dispersion in the optical signal.

21. The system of claim 19, wherein the dispersion compensating element comprises a dispersion compensating fiber.

22. The system of claim 1, wherein at least a portion of a gain medium for the distributed Raman amplifier stage comprises a dispersion compensating fiber.

23. The system of claim 1, wherein at least one of the interface devices introduces to the fiber optic transmission link a loss of at least 6 decibels.

24. The system of claim 1, wherein the fiber optic transmission link is coupled to another network operable to facilitate communication over a distance greater than 300 kilometers.

25. A fiber optic transmission system for a metropolitan area network, comprising:

a transmitter assembly operable to generate a plurality of optical wavelength signals;

a combiner operable to combine the plurality of optical wavelength signals into a multiple wavelength optical signal comprising at least 160 wavelengths and occupying a bandwidth of at least 60 nanometers, the combiner operable to facilitate communication of the multiple wavelength optical signal over a communication link in a metropolitan area network spanning no more than 300 kilometers; and a multiple stage optical amplifier coupled to the communication link and comprising at least one Raman amplifier stage capable of operating on a bandwidth of at least 60 nanometers.

26. The system of claim 25, wherein the transmitter assembly comprises a plurality of optical sources, each operable to generate one of the plurality of optical wavelength signals.

27. The system of claim 25, wherein the combiner comprises a wavelength division multiplexer.

28. The system of claim 25, wherein the at least one Raman amplifier stage provides a net gain to at least some of the plurality of optical wavelength signals.

29. The system of claim 25, wherein the at least one Raman amplifier stage provides at least a 5 decibel gain to at least a majority of the plurality of optical wavelength signals.

30. The system of claim 25, wherein the at least one Raman amplifier stage provides an effective noise figure of less than 8 decibels for at least a majority of the plurality of optical wavelength signals.

31. The system of claim 25, wherein the at least one Raman amplifier stage comprises a distributed Raman amplifier.

32. The system of claim 25, wherein the at least one Raman amplifier stage comprises a discrete Raman amplifier.

33. The system of claim 25, wherein the multiple stage amplifier includes a discrete Raman amplifier stage and a distributed Raman amplifier stage.

34. The system of claim 25, wherein the multiple stage amplifier is operable to reduce double Rayleigh scattering.

35. The system of claim 25, wherein the multiple stage amplifier comprises:

one stage having a first sloped gain profile; and another stage having a second sloped gain profile that is approximately complementary to the first sloped gain profile.

36. The system of claim 25, further comprising:

a plurality of interface devices coupled to the communication link, wherein the plurality of interface devices collectively introduce to the communication link a loss of at least six (6) decibels, and wherein the at least one Raman amplifier stage comprises a distributed Raman amplifier operable to pump at least a portion of the communication link to provide Raman gain operable to at least partially compensate for the loss introduced by the plurality of interface devices.

37. The system of claim 36, wherein the loss introduced to the communication link by at least one of the plurality of interface devices comprises at least 6 decibels in magnitude.

38. The system of claim 36, wherein the plurality of interface devices comprise devices selected from a group consisting of an optical add/drop multiplexer, an optical cross connect, a gain equalizer, a variable optical attenuator, a signal to noise ratio booster, a dispersion compensation element, a filter, a polarization mode dispersion compensator, an isolator, a tap, a coupler, a wavelength division multiplexer, and a pump dump.

39. The system of claim 25, wherein the optical signal comprises a multiple wavelength signal comprising more than 200 wavelengths.

40. The system of claim 25, wherein the fiber optic transmission link operates at a transport rate of at least 9.5 gigabits per second, and wherein the fiber optic transmission link includes a dispersion compensating element operable to at least partially compensate for a dispersion in the optical signal.

41. The system of claim 25, wherein at least a portion of a gain medium for the Raman amplifier stage comprises a dispersion compensating fiber.

42. The system of claim 25, wherein the fiber optic transmission link is coupled to another network operable to facilitate communication over a distance greater than 300 kilometers.

43. A fiber optic transmission system for a metropolitan area network, comprising:
- a transmitter assembly operable to generate a plurality of optical wavelength signals, at least some of the plurality of optical wavelength signals comprising a transport rate of at least 9.5 gigabits per second;
- a combiner operable to combine the plurality of optical wavelength signals into a multiple wavelength optical signal and to facilitate communication of the multiple wavelength optical signal over a communication link in a metropolitan area network spanning no more than 300 kilometers; and
- a discrete Raman amplifier stage comprising a gain medium, wherein at least a portion of the gain medium comprises a dispersion compensating fiber operable to at least partially compensate for a dispersion in at least some of the plurality of optical wavelength signals, and wherein the discrete Raman amplifier stage is operable to pump the dispersion compensating fiber to produce Raman gain to at least partially offset a loss associated with the dispersion compensating fiber.

44. The system of claim 43 wherein the discrete Raman amplifier stage provides a net gain to at least some of the plurality of optical wavelength signals over the dispersion compensating fiber.

45. The system of claim 43 wherein the discrete Raman amplifier stage provides at least a 5 decibel gain to at least some of the plurality of optical wavelength signals.

46. The system of claim 43 wherein the discrete Raman amplifier provides an effective noise figure of less than 8 decibels to at least some of the plurality of optical wavelength signals.

47. The system of claim 43 wherein the discrete Raman amplifier stage comprises part of a multiple stage amplifier further comprising a distributed Raman amplifier stage.

48. The system of claim 43 further comprising:
- a plurality of interface devices coupled to the communication link, wherein the plurality of interface devices collectively introduce to the communication link a loss of at least six (6) decibels, and wherein the at least one Raman amplifier stage comprises a distributed Raman amplifier operable to pump at least a portion of the communication link to provide Raman gain operable to at least partially compensate for the loss introduced by the plurality of interface devices.

49. The system of claim 48 wherein the loss introduced to the communication link by at least one of the plurality of interface devices comprises at least 6 decibels in magnitude.

50. The system of claim 48 wherein the plurality of interface devices comprise devices selected from a group consisting of an optical add/drop multiplexer, an optical cross connect, a gain equalizer, a variable optical attenuator, a signal to noise ratio booster, a dispersion compensation element, a filter, a polarization mode dispersion compensator, an isolator, a tap, a coupler, a wavelength division multiplexer, and a pump dump.

51. The system of claim 43 wherein the multiple wavelength optical signal comprises at least 160 wavelength signals occupying a bandwidth of at least 40 nanometers.

52. The system of claim 43, wherein the multiple wavelength optical signal comprises at least 160 wavelength signals occupying a bandwidth of at least 80 nanometers.

53. The system of claim 43, wherein the multiple wavelength optical signal comprises at least 200 wavelength signals.

54. The system of claim 43, wherein the fiber optic transmission link is coupled to another network operable to facilitate communication over a distance greater than 300 kilometers.

55. An optical communication system, comprising:
- a communication link in a metropolitan area network spanning no more than 300 kilometers operable to communicate a multiple wavelength optical signal comprising at least 160 wavelengths and occupying a bandwidth of at least 60 nanometers, wherein at least some wavelengths are dedicated for communication with particular nodes coupled to the communication link; and
- a multiple stage optical amplifier coupled to the communication link and comprising at least one Raman amplifier stage capable of operating on a bandwidth of at least 60 nanometers.

56. The system of claim 55, wherein the at least one Raman amplifier stage provides a net gain to at least a portion of the multiple wavelength optical signal.

57. The system of claim 55, wherein the at least one Raman amplifier stage provides at least a 5 decibel gain to at least a majority of the multiple wavelength optical signal.

58. The system of claim 55, wherein the at least one Raman amplifier stage provides an effective noise figure of less than 8 decibels for at least a majority of the multiple wavelength optical signal.

59. The system of claim 55, wherein the at least one Raman amplifier stage comprises a distributed Raman amplifier stage.

60. The system of claim 55, wherein the at least one Raman amplifier stage comprises a discrete Raman amplifier stage.

61. The system of claim 55, wherein the multiple stage amplifier includes a discrete Raman amplifier stage and a distributed Raman amplifier stage.

62. The system of claim 55, wherein the multiple stage amplifier comprises:
- one stage having a first sloped gain profile; and
- another stage having a second sloped gain profile that is approximately complementary to the first sloped gain profile.

63. The system of claim 55, further comprising:
- a plurality of interface devices coupled to the communication link, wherein the plurality of interface devices collectively introduce to the communication link a loss of at least six (6) decibels, and wherein the at least one Raman amplifier stage comprises a distributed Raman amplifier operable to pump at least a portion of the communication link to provide Raman gain operable to at least partially compensate for the loss introduced by the plurality of interface devices.

64. The system of claim 63, wherein the loss introduced to the communication link by at least one of the plurality of interface devices comprises at least 6 decibels in magnitude.

65. The system of claim 63, wherein the plurality of interface devices comprise devices selected from a group consisting of an optical add/drop multiplexer, an optical cross connect, a gain equalizer, a variable optical attenuator, a signal to noise ratio booster, a dispersion compensation element, a filter, a polarization mode dispersion compensator, an isolator, a tap, a coupler, a wavelength division multiplexer, and a pump dump.

66. The system of claim 55, wherein the multiple wavelength signal comprises more than 200 wavelengths.

67. The system of claim 55, wherein the communication link operates at a transport rate of at least 9.5 gigabits per second, and wherein the communication link includes a dispersion compensating element operable to at least partially compensate for a dispersion in the optical signal.

68. The system of claim 55, wherein at least a portion of a gain medium for the Raman amplifier stage comprises a dispersion compensating fiber.

69. The system of claim 55, wherein the fiber optic transmission link is coupled to another network operable to facilitate communication over a distance greater than 300 kilometers.

70. A method of communicating optical signals in a metropolitan area network, comprising:
  communicating a plurality of optical signals over a communication link in a metropolitan area network spanning 300 kilometers or less, wherein the communication link comprises a transmission loss associated with an unpumped state;
  passing at least some of the plurality of optical signals through a plurality of interface devices coupled to the communication link, wherein the plurality of interface devices collectively introduce a loss of at least 6 decibels to the communication link; and
  forming a distributed Raman amplification stage by pumping at least a portion of the communication link to reduce the transmission loss of the at least a portion of the link compared to its unpumped state, the reduced link transmission loss facilitating allocation of at least a portion of a gain to at least partially offset the loss associated with the plurality of interface devices.

71. The method of claim 70, wherein the distributed Raman amplifier stage entirely compensates for the loss introduced to the fiber optic transmission link by the plurality of interface devices.

72. The method of claim 70, wherein the distributed Raman amplifier stage provides a net gain to at least a portion of the optical signal.

73. The method of claim 70, wherein the plurality of interface devices comprise devices selected from a group consisting of an optical add/drop multiplexer, an optical cross connect, a gain equalizer, a variable optical attenuator, a signal to noise ratio booster, a dispersion compensation element, a filter, a polarization mode dispersion compensator, an isolator, a tap, a coupler, a wavelength division multiplexer, and a pump dump.

74. The method of claim 70, wherein the optical signal comprises a multiple wavelength signal comprising more than 160 wavelengths.

75. The method of claim 74, wherein the multiple wavelength signal occupies a bandwidth of at least 40 nm.

76. The method of claim 70, wherein the optical signal comprises a multiple wavelength signal comprising more than 200 wavelengths.

77. The method of claim 70, wherein at least some of the plurality of optical signals comprise a transport rate of at least 9.5 gigabits per second.

78. The method of claim 70, further comprising:
  passing the optical signal over a dispersion compensating fiber to at least partially compensate for a dispersion experienced by at least a portion of the multiple wavelength optical signal; and
  pumping the dispersion compensating fiber to produce Raman gain to at least partially offset a loss associated with the dispersion compensating fiber.

79. The method of claim 70, further comprising passing at least most of the plurality of wavelengths through a multiple stage optical amplifier capable of operating on a bandwidth of at least 60 nanometers, wherein the multiple stage optical amplifier offsets at least a portion of a loss experienced by the multiple wavelength optical signal as it traverses the communication link.

80. The method of claim 70, wherein at least one of the interface devices introduces to the fiber optic transmission link a loss of at least 6 decibels.

81. The method of claim 70, wherein the communication link is coupled to another network operable to facilitate communication over a distance greater than 300 kilometers.

82. A method of communicating optical signals in a metropolitan area network, comprising:
  generating a plurality of optical wavelength signals;
  combining at least some of the plurality of wavelength signals into a multiple wavelength optical signal comprising at least 160 wavelengths and occupying a bandwidth of at least 60 nanometers;
  communicating the multiple wavelength optical signal over a communication link in a metropolitan area network spanning no more than 300 kilometers; and
  passing at least most of the plurality of wavelengths through a multiple stage optical amplifier capable of operating on a bandwidth of at least 60 nanometers, wherein the multiple stage optical amplifier offsets at least a portion of a loss experienced by the multiple wavelength optical signal as it traverses the communication link.

83. The method of claim 82, wherein the multiple stage optical amplifier provides a net gain to at least a portion of the multiple wavelength optical signal.

84. The method of claim 82, wherein the multiple wavelength signal comprises more than 200 wavelengths.

85. The method of claim 82, wherein the optical signal occupies a bandwidth of at least 80 nanometers.

86. The method of claim 82, wherein at least some of the plurality of optical signals comprise a transport rate of at least 9.5 gigabits per second.

87. The method of claim 82, further comprising:
  passing the optical signal over a dispersion compensating fiber to at least partially compensate for a dispersion experienced by at least a portion of the multiple wavelength optical signal; and
  pumping the dispersion compensating fiber to produce Raman gain to at least partially offset a loss associated with the dispersion compensating fiber.

88. The method of claim 82, wherein the communication link is coupled to another network operable to facilitate communication over a distance greater than 300 kilometers.

89. A method of communicating optical signals in a metropolitan area network, comprising:

generating a plurality of optical wavelength signals, each of the plurality of optical wavelength signals comprising a transport rate of at least 9.5 gigabits per second;

combining at least some of the plurality of wavelength signals into a multiple wavelength optical signal;

communicating the multiple wavelength optical signal over a communication link in a metropolitan area network spanning no more than 300 kilometers;

passing the multiple wavelength optical signal over a dispersion compensating fiber to at least partially compensate for a dispersion experienced by at least a portion of the multiple wavelength optical signal; and pumping the dispersion compensating fiber to produce Raman gain to at least partially offset a loss associated with the dispersion compensating fiber.

90. The method of claim 89, wherein pumping the dispersion compensating fiber provides a net gain to at least a portion of the multiple wavelength optical signal.

91. The method of claim 89, wherein the multiple wavelength signal comprises more than 160 wavelengths.

92. The method of claim 89, wherein the multiple wavelength optical signal occupies a bandwidth of at least 60 nanometers.

93. The method of claim 89, wherein the communication link is coupled to another network operable to facilitate communication over a distance greater than 300 kilometers.

\* \* \* \* \*